United States Patent [19]
Bayer et al.

[11] Patent Number: 5,925,430
[45] Date of Patent: Jul. 20, 1999

[54] LINED PLASTIC CLOSURE

[75] Inventors: John W. Bayer, Perrysburg; James G. Mierzwiak, Toledo, both of Ohio

[73] Assignee: Owens-Illinois Closure Inc., Toledo, Ohio

[21] Appl. No.: 08/695,519

[22] Filed: Aug. 12, 1996

Related U.S. Application Data

[63] Continuation of application No. 08/381,591, Jan. 31, 1995, abandoned.

[51] Int. Cl.$^6$ .............................. B65B 53/00; F16B 4/00
[52] U.S. Cl. ..................... 428/35.1; 428/35.7; 428/172; 428/192; 428/411.1; 428/500
[58] Field of Search ................................. 428/172, 192, 428/35.1, 35.7, 411.1, 500

[56] References Cited

U.S. PATENT DOCUMENTS 5,306,542   4/1994   Bayer .

FOREIGN PATENT DOCUMENTS

| | | |
|---|---|---|
| 0416815 | 3/1991 | European Pat. Off. . |
| 9308221 | 4/1993 | WIPO . |

OTHER PUBLICATIONS

Proceedings of the Second International Business Forum on Specialty Polyolefins SPO '92, Sep. 22–24, 1992, pp. 155–165.

Proceedings of the Third International Business Forum on Specialty Polyolefins SPO '93, Sep. 21–23, 1993, pp. 227–245, 271–296.

Whelan, "Polymer Technology Dictionary", (pp. 224–225) 1984 (Defines LLDPE).

*Primary Examiner*—Cecilia J. Tsang
*Assistant Examiner*—Patrick R. Delaney

[57]   ABSTRACT

A plastic closure comprising a base wall and a peripheral skirt. The base wall has an inner surface and a liner is bonded to the inner surface of the base wall of the closure. The liner comprises a fusion blend of a linear ethylene polymer made utilizing single-site catalysts and a lubricant. Preferably the linear ethylene polymer is selected from the group consisting of ethylene-1-octene copolymers and ethylene-1-butene copolymers. The liner is preferably compression molded in the closure. The lubricant comprises an amide, preferably selected from the group consisting of oleamide, erucamide, stearamide, and EBS (ethylene bis stearamide).

22 Claims, No Drawings

LINED PLASTIC CLOSURE

This application is a continuation of application Ser. No. 08/381,591 filed on Jan. 31, 1995, now abandoned.

This invention relates to plastic closures including liners used especially for hot fill or autoclave applications.

BACKGROUND AND SUMMARY OF THE INVENTION

Conventional liners of EVA or thermoplastic olefins or mixtures thereof usually contain additives such as plasticizers, e.g., mineral oil, which may contribute to contamination of products. Such prior art liners did not offer higher temperature resistances.

In the U.S. Pat. No. 5,306,542 there is disclosed a plastic closure a plastic closure including a base wall having an inner surface, a peripheral skirt extending from the base wall and a liner on the inner surface of the base wall. The liner includes (a) an ethylene vinyl acetate composition, (b) a primary fatty acid amide and (c) a bis-fatty acid amide. Preferably the primary fatty acid amide comprises an oleamide or an erucamide, and the bis-fatty acid amide comprises ethylene-bis-stearamide.

Among the objectives of the present invention are to provide a closure and a liner that can be adhered or preferably compression molded in plastic; and that has specific physical and chemical properties such that the closure and liner can be used for hot fill or autoclaves applications.

In accordance with the invention, the lined plastic closures are capable of withstanding high temperatures which are provided with a liner of a constrained geometry catalyst and polyolefins blended with an amide to provide specific physical and chemical properties, namely, higher temperature resistance, necessary hardness, good process ability.

In accordance with the invention, a plastic closure includes a base wall having an inner surface, a peripheral skirt extending from the base wall and a liner on the inner surface of the base wall.

DESCRIPTION OF THE PREFERRED EMBODIMENTS

In accordance with the invention, a plastic closure includes a base wall having an inner surface, a peripheral skirt extending from the base wall and a liner on the inner surface of the base wall.

The liner comprises a fusion blend of a linear ethylene polymer made utilizing single-site catalysts and a lubricant. Preferably, the linear ethylene polymer is selected from the group consisting of ethylene-l-octene copolymers and ethylene-1-butene copolymers. Linear ethylene polymers of the ethylene-1-octene copolymers are made by Dow Chemical Company and are identified as using DOW INSITE Technology as described in Proceedings of the Second International Business Forum on Specialty Polyolefins SPO '92, Sep. 22–24, 1992, pages 155–165 and in Proceedings of the Third International Business Forum on Specialty Polyolefins SPO '93, Sep. 21–23, 1993, pages 227–245. Ethylene-1-butene copolymers are made by EXXON Chemical Company and are identified as Exxon Exact technology as described in Proceedings of the Third International Business Forum SPO '93, Sep. 21–23, 1993, pages 271–296. Such linear ethylene polymers are sometimes called constrained geometric catalyst polyolefins or CGCP resins.

The liner is preferably compression molded.

The lubricant comprises an amide. The lubricant may be selected from the group consisting of oleamide, erucamide, stearamide, and EBS. The lubricant ranges between about 0.25% to 4.5%, by weight, of the liner. When the lubricant comprises oleamide, it is preferably in the range of about 0.25% to 2.0%, by weight, of the liner. When the lubricant comprises erucamide, it is preferably in a range of about 0.25% to 2.0% by weight, of the liner. When the lubricant comprises a mixture of oleamide and erucamide, it is preferably in a total amount of 1.0% by weight, of the liner. When the lubricant comprises a mixture of erucamide and EBS, it is preferably in a total amount of 1%, by weight, of the liner.

The preferred amount of amide used depends on the intended contents of the container which the closure is used. Thus for preferably food and beverage use the amount of 1% ranges between about 0.5% to about 2.0% by weight of the liner. For oil use, the amount of oleamide ranges between about 0.25% and 0.60% by weight of the liner. For bleach use, the amount of oleamide ranges between about 0.5% and 1.5% by weight of the liner.

Tests have been conducted as shown in the following Tables 1–5. Table 1 lists the physical properties of the tested material. The Dow materials are all ethylene-1-octene copolymers made from Dow's INSITE technology. The Exxon materials are all ethylene-1-butene copolymers made from their EXACT technology. Listed are the melt index, hardness, density and crystalline melting points of the virgin materials as received from the vendors.

Table 2 lists all the formulations compounded at OI using the vendor material. Lubricant numbers are utilized to designate the fatty amide lubricant used in the particular formulations. Coefficient of friction at various times is recorded along with the compound hardness.

Table 3 lists the formulation and pack data for the useful formulations, both beverage and food applications. In this Table, the formulations are broken down to their individual components and percent content including all substances that would be entered into the formula from the colorant utilized. The 28 mm beverage closures were applied to the containers with a laboratory filler and capper. The 43 mm Hot Pack (food) closures were packed on PET containers filled with 185° F. water using an OI #59 Series Capper with 5 oz. steam surrounding the closure at application.

Table 4 lists the formulation and data on the most useful non-food compounds. These formulations have been lined into 38 mm closures.

Table 5 lists all the non-food formulations generated along with their hardness and coefficient of friction.

It has been found that for all uses, the melt flow of the materials has to exceed 20 gm/10 min so that pellet bounce during the lining operation is not a problem.

Densities of the useful materials are dependent on the end use. For beverage applications, densities can range between 0.900 g/cc to 0.915 g/cc, this range giving the necessary hardness values of 90–95 Shore A. When utilized for oil applications, materials with a density less than 0.880 g/cc are un-suitable due to the oil dissolving the liner material. Maximum density for oil liner material is 0.900 g/cc. Bleach applications can utilize materials of densities of the minimum available to about 0.880 g/cc.

Coefficient of friction has been determined on 0.005" films using an Altec COF testor. Hardness values are all Shore A. Pack data was derived from closures molded by the compression molding process with the liner formed by compression molding.

It can thus be seen that there has been provided a closure and liner that can be adhered or preferably compression molded in plastic; and that has specific physical and chemical properties such that the closure and liner can be used for hot fill or autoclaves applications.

TABLE 1

CGCT MATERIALS PHYSICAL PROPERTIES

| MATERIAL | MELT INDEX | HARDNESS (Shore A) | DENSITY (gm/cc) | MELT TEMP (° C.) | VISC $1000^{-1}$ | $P_{O2}$ | MOLDING |
|---|---|---|---|---|---|---|---|
| DOW | | | | | | | |
| 48562-A32 | 9.3 | 95 | 0.908 | 103 | 2256 | 722 | poor |
| 48562-A34 | 4.6 | 95 | 0.908 | 103 | 3061 | | |
| 48562-C28 | 1.3 | 87 | 0.885 | | | 2421 | |
| 48562-C29 | 1.5 | 94 | 0.902 | | | | |
| 48562-C32 | 2.3 | 93 | 0.903 | | | | |
| 48562-14C | 17 | | 0.903 | | 1763 | | poor |
| 48562-14D | 28 | | 0.902 | 96 | 1328 | | good |
| 48562-C45 | 30 | 95 | 0.903 | 96 | | | good |
| XU:59002.00 | 30 | 95 | 0.912 | 105 | | | good |
| XU:59400.00 | 30 | 86 | 0.885 | | | | |
| 48562-E29 | 30 | 74 | 0.870 | | | | |
| EXXON | | | | | | | |
| Exact 3022 | 9.0 | 94 | 0.905 | 95 | | | |
| Exact 4028 | 10.0 | 78 | 0.880 | | | | |
| Exact 3017 | 27 | 85 | 0.901 | | | | |
| Exact 4023 | 35 | 80 | 0.880 | | | | |

*DOW 48562-C45 is now numbered XU-59100.00
DOW 48562-E29 is now numbered XU-58320.01

TABLE 2

FOOD AND BEVERAGE FORMULATIONS

| CODE | MATERIALS | REMARKS | LUBE | IMMED | COF 1 HOUR | 1 DAY | HARDNESS |
|---|---|---|---|---|---|---|---|
| UL-1 | Dow A-34 | 38947NMBD3 | oleamide 1.0% | 0.045 | 0.035 | 0.035 | 95 |
| UL-2 | " | " | oleamide 1.5% | 0.045 | 0.035 | 0.030 | 96 |
| UL-3 | " | " | oleamide 2.0% | 0.035 | 0.035 | 0.040 | 97 |
| UL-4 | " | 38947NMBD1 | erucamide 1.0% | 0.350 | 0.040 | 0.030 | 97 |
| UL-5 | " | " | erucamide 1.5% | 0.300 | 0.040 | 0.030 | 98 |
| UL-6 | " | " | erucamide 2.0 | 0.070 | 0.040 | 0.035 | 98 |
| UL-7 | " | 38947NMBD2 | EBS 1.0% | | | | |
| UL-8 | " | " | EBS 1.5% | | | | |
| UL-9 | " | " | EBS 2.0% | | | | |
| UL-10 | Dow A-32[a,b] | 38947NMBD3 | oleamide 1.0% | 0.040 | 0.035 | 0.040 | 94 |
| UL-11 | " | " | oleamide 1.5% | 0.040 | 0.040 | 0.045 | 96 |
| UL-12 | " | " | oleamide 2.0% | 0.050 | 0.035 | 0.045 | 96 |
| UL-13 | " | 38947NMBD1 | erucamide 1.0% | 0.060 | 0.035 | 0.035 | 96 |
| UL-14 | " | " | erucamide 1.5% | 0.080 | 0.035 | 0.035 | 97 |
| UL-15 | " | " | erucamide 2.0% | 0.080 | 0.030 | 0.035 | 97 |
| UL-16 | Dow A-32 | lube only | oleamide 1.5% | 0.110 | 0.040 | 0.035 | 94 |
| UL-17 | Dow A-34 | lube only | erucamide 1.5% | 0.050 | 0.040 | 0.035 | 96 |
| UL-18 | Dow A34/Elvax 650 | 75/25 | oleamide 1.0% | 0.130 | 0.040 | 0.050 | 95 |
| UL-19 | Dow A34/Elvax 650 | 50/50 | oleamide 1.0% | 0.150 | 0.045 | 0.050 | 95 |
| UL-20 | " | 25/75 | oleamide 1.0% | 0.150 | 0.050 | 0.050 | 95 |
| UL-21 | Dow A34/Elvax 450 | 75/25 | oleamide 1.0% | >0.40 | 0.040 | 0.045 | 93 |
| UL-22 | " | 50/50 | oleamide 1.0% | >0.40 | 0.050 | 0.045 | 93 |
| UL-23 | " | 25/75 | oleamide 1.0% | >0.40 | 0.050 | 0.055 | 92 |
| UL-24 | Dow A-32 | | oleamide 0.75% | 0.150 | 0.035 | 0.040 | 96 |
| UL-25 | " | | oleamide 0.50% | >0.40 | 0.035 | 0.040 | 96 |
| UL-26 | " | | oleamide 0.25% | >0.40 | 0.035 | 0.040 | 96 |
| UL-27 | " | | erucamide 0.75% | >0.40 | 0.045 | 0.040 | 97 |
| UL-28 | " | | erucamide 0.50% | >0.40 | 0.050 | 0.040 | 97 |
| UL-29 | " | | erucamide 0.25% | >0.40 | 0.065 | 0.040 | 96 |
| UL-30 | Dow A-32 | | stearamide 1.0% | >0.40 | >0.40 | 0.155 | 96 |
| UL-31 | " | lube 50/50 | stear/olea 1.0% | 0.080 | 0.030 | 0.035 | 95 |
| UL-32 | " | " | stear/eru 1.0% | >0.40 | 0.045 | 0.038 | 94 |
| UL-33 | " | " | stear/EBS 1.0% | >0.40 | >0.40 | 0.185 | 96 |
| UL-34 | Dow A-32 | lube 50/50 | olea/eru 1.0% | 0.040 | 0.035 | 0.035 | 96 |
| UL-35 | " | " | olea/EBS 1.0% | 0.050 | 0.035 | 0.032 | 96 |

TABLE 2-continued

FOOD AND BEVERAGE FORMULATIONS

| CODE | MATERIALS | REMARKS | LUBE | IMMED | COF 1 HOUR | 1 DAY | HARDNESS |
|---|---|---|---|---|---|---|---|
| UL-36 | " | " | eru/EBS 1.0% | 0.100 | 0.035 | 0.030 | 95 |
| UL-7 |  |  | EBS 1.0% | >0.40 | 0.100 | 0.070 | 95 |
| UL-37 | A-32/DP-8310 | 75/25 | oleamide 1.0% | >0.40 | >0.40 | 0.055 | 96 |
| UL-38 | A-32/DP-8310 | 50/50 | oleamide | >0.40 | >0.40 | >0.40 | 94 |
| UL-39 | A-32/DP-8310 | 25/75 | oleamide | >0.40 | >0.40 | >0.40 | 92 |
| UL-40 | A-32/butyl | 75/25 | oleamide 1.0% | >0.40 | >0.40 | 0.055 | 92 |
| UL-41 | A-32/butyl | 50/50 | oleamide 1.0% | >0.40 | >0.40 | 0.115 | 83 |
| UL-42 | A-32/butyl | 25/75 | oleamide 1.0% | — | — | — | — |
| UL-43 | A-32(11223-67-1 | 75/25 | oleamide 1.0% | >0.40 | >0.40 | 0.035 | 96 |
| UL-44 | A-32(11223-67-1 | 50/50 | oleamide 1.0% | >0.40 | >0.40 | 0.035 | 94 |
| UL-45 | A-32(11223-67-1 | 25/75 | oleamide 1.0% | >0.40 | >0.40 | 0.045 | 94 |
| UL-46 | C-28 | 38947NMBD3 | oleamide 1.0% | >0.40 | 0.150 0.060@ 24 hr | 0.040 | 89 |
| UL-47 | C-29 | " | " | 0.060 | 0.040 | 0.045 | 95 |
| UL-48 | C-32 | " | " | 0.065 | 0.040 | 0.035 | 95 |
| UL-49 | -14C[a] | 38947NMBD3 | oleamide 1.0% | >0.40 | 0.045 | 0.040 | 94 |
| UL-50 | -14D[a] | " | oleamide 1.0% | >0.40 | 0.030 | 0.040 | 94 |
| UL-51 | -C45 20 MI car | 38947NMBD3 | oleamide 1.0% | 0.150 | 0.035 | 0.040 | 95 |
| UL-51A | -C45[a,b] 50 MI car. | 38947NMBE3 | oleamide 1.0% | >0.400 | 0.050 | 0.040 | 95 |
| UL-52 | XU:59002.00[a,b] |  | oleamide 1.0% | 0.060 | 0.040 | 0.040 | 95 |
| UL-53 | XU:59002.00[a,b] | 38947NMBD1 | erucamide 1.0% | >0.400 | 0.045 | 0.035 | 95 |
| UL-54 | Dowlex 2517 (LLDPE)[c] | 38947NMBD3 | oleamide 1.0% |  |  |  | 96 |
| UL-55 | XU59002.00[c] | 301275NMB Insite carrier | erucamide 1.0% | >0.400 | 0.035 | 0.035 | 95 |
| UL-56 | Exxon 3022 Exact[c] | 38947NMBD1 | erucamide 1.0% | >0.400 | 0.080 | 0.045 | 92 |
| UL-58 | Exxon 3022 Exact |  | oleamide 1.0% | 0.090 | 0.040 | 0.035 | 95 |
| UL-59 | " |  | eru/EBS 1.0% | >0.400 | 0.90 | 0.070 | 95 |
| UL-60 | Dow 59002:00 |  | eru/EBS 1.0% | >0.400 | 0.110 | 0.100 | 91 |
| UL-61 | Exxon 3017 Exact | 38947NMBD1 | erucamide 1.0% | >0.400 | 0.050 | 0.045 | 92 |

[a]packed under hot pack conditions.
[b]packed under beverage conditions.
1. all Dow materials are prefixed by the 48562- designation

TABLE 3

CGCT PATENT - PACK DATA
BEVERAGE AND FOOD

| Formulation # | UL-10 | UL-51A | UL-52 | UL-53 | UL-55 |
|---|---|---|---|---|---|
| Material |  |  |  |  |  |
| resin (89%) | 48562-A32 | 48562-C45 | XU59002 | XU59002 | XU59002 |
| LDPE (10%) | 20 melt | 50 melt | 20 melt | 20 melt | — |
| XU59002 (10%) | — | — | — | — | 30 melt |
| oleamide (1%) | 1% | 1% | 1% | — | — |
| erucamide (1%) | — | — | — | 1% | 1% |
| BEVERAGE |  |  |  |  |  |
| removal torque (in. lb.) |  |  |  |  |  |
| immed | 9.2 | 9.7 | 10.1 | 10.9 | 11.7 |
| 1 day | — | 10.9 | 10.1 | 11.6 | 9.5 |
| 1 week | 9.2 | 10.3 | 9.6 | 10.6 | 9.2 |
| 2 week | 10.4 | 10.8 | 11.1 | 10.5 | 8.8 |
| 3 week | 11.0 | 11.1 | 10.2 | 9.6 | 8.1 |
| 4 week | 11.1 | 9.6 | 10.7 | 10.4 | 7.8 |
| $CO_2$ (volume) |  |  |  |  |  |
| imm |  | 3.76 | 3.62 | 3.56 | 3.76 |
| 1 day |  | 3.72 | 3.61 | 3.78 | 3.82 |
| 1 week | 3.97 | 3.81 | 3.65 | 3.5 | 3.81 |
| 2 week | 4.31 | 3.68 | 3.76 | 3.53 | 3.66 |
| 3 week | 3.73 | 3.64 | 3.58 | 3.63 | 3.63 |
| 4 week | 3.63 | 3.70 | 3.64 | 3.46 | 3.72 |

TABLE 3-continued

CGCT PATENT - PACK DATA
BEVERAGE AND FOOD

| Formulation # | UL-10 | UL-51A | UL-52 | UL-53 | UL-55 |
|---|---|---|---|---|---|
| HOT PACK | | | | | |
| removal torque | | | | | |
| 1 day | 20.2 | 14.0 | 15.4 | 15.4 | — |
| 1 week | 16.6 | 15.3 | 9.8 | 12.8 | — |
| 1 month | 16.3 | 15.0 | 12.8 | 11.8 | — |
| Leakage | none | none | none | none | — |
| $O_2$ permeation | 0.060 cc/day | 0.061 cc/day | 0.054 cc/day | — | — |

TABLE 4

NON FOOD PATENT DATA

| Formulations | LQ-02 | LQ-06 | LQ-07 | LQ-09 (Blue) | LQ-18 (Black) | LQ-11 | LQ-12 | LQ-13 | LQ-14 | LQ-15 | LQ-19 | LQ-20 |
|---|---|---|---|---|---|---|---|---|---|---|---|---|
| Resin(89%) | Exact 4028 | XU59400 | XU-58320.01 | 1:159400: 58320.01 | 1:159400: 58320.01 | XU-59400 | XU58320.01 | XU58320.01 | 59400/ TPO* 25/75 | 59400/ TPO* 50/50 | Exact 4023 | Elvax 250/ 58320.01 |
| LDPE(10%) oleamide | 1.0% | 1.0% | 1.0% | 1.0% | 1.0% | 0.5% | 0.5% | 0.25% | 0.25% | 0.5% | 0.5% | eru 0.5% |
| Hardness | 79 | 86 | 74 | 80 | 80 | 80 | | | 71 | 73 | 80 | 85 |
| COF (1 day) | 0.080 | 0.045 | 0.050 | 0.050 | 0.055 | | | | >0.400 | >0.400 | | |
| Processing use | poor oil bleach | good oil | good oil bleach | good bleach | good bleach | good oil | | | good oil | good oil | good oil | good oil |
| Pack Results | | | | | | | | | | | | |
| OIL CAP | | | | | | | | | | | | |
| 28 mm closure removal torque (1 wk) | | 5.1 | 3.5 | 7.1 | | | | | | | | |
| adhesion | | good | good | good | | good | | | good | good | good | good |
| leakage | | 0% | 10% | 10% | | 0% | | | 0% | 0% | 10% | 10% |
| compatability | OK | dissolved | OK | OK | | OK | dissolved | dissolved | OK | OK | dissolved | OK |
| BLEACH | | | | | | | | | | | | |
| 38 mm closure removal torque (1 mo) | 13.0 | | 12.5 | 13.7 | 13.5 | | | | | | | |
| leakage | 0 | | 0 | 0 | 0 | | | | | | | |
| adhesion | good | | good | good | good | | | | | | | |
| liner decay | none | | none | none | none | | | | | | | |

*Teknor Apex TPO 83F943DNT-729 blue
Elvax - DuPont EVA

TABLE 5

(Revised)
LQ NON-FOOD FORMULATIONS

| | | | COF | | | |
|---|---|---|---|---|---|---|
| LQ | RESIN | LUBE | immed | 4 hr | 24 hr | HARD |
| LQ-01 | exact 4028 | eru 1.0% | >0.400 | >0.400 | >0.400 | 80 |
| LQ-02 | " | ole 1.0% | >0.400 | >0.400 | 0.080 | 79 |
| LQ-03 | exact 3017 | eru 1.0% | >0.400 | 0.050 | 0.045 | 92 |
| LQ-04 | " | ole 1.0% | >0.400 | 0.050 | 0.040 | 92 |
| LQ-05 | adv XU59400.00 | eru 1.0% | >0.400 | >0.400 | 0.100 | 86 |

TABLE 5-continued (Revised)
LQ NON-FOOD FORMULATIONS

| LQ | RESIN | LUBE | COF immed | 4 hr | 24 hr | HARD |
|---|---|---|---|---|---|---|
| LQ-06 | " | ole 1.0% | >0.400 | 0.090 | 0.045 | 86 |
| LQ-07 | adv -E29* | ole 1.0% | >0.400 | >0.400 | 0.050 | 74 |
| LQ-08 | adv -E29 | eru 1.0% | >0.400 | >0.400 | 0.195 | 74 |
| LQ-09 | 1:1 XU59400.00: XU58320.01 | ole 1.0% blue | >0.400 | 0.100 | 0.050 | 80 |
| LQ-10 | 1:1 59400.00/E29 | eru 1.0% | >0.400 | 0.250 | 0.100 | 79 |
| LQ-11 | XU59400.00 | ole 0.5% | | | | |
| LQ-12 | XU58320.01 | ole 0.5% | | | | |
| LQ-13 | XU58320.01 | ole 0.25% | | | | |
| LQ-14 | XU59400/TPO** | ole 0.25% | >0.400 | >0.400 | >0.400 | 71 |
| LQ-15 | XU59400/TPO 50/50 | ole 0.50% 50 melt | >0.400 | >0.400 | >0.400 | 73 |
| LQ-16 | Elvax 250/TPO 25/75 | ole 0.25% 50 melt | >0.400 | >0.400 | >0.400 | 71 |
| LQ-17 | Elvax 250/TPO 10/90 | ole 0.10% | >0.400 | >0.400 | >0.400 | 72 |
| | Teknor oil TPO | | >0.400 | >0.400 | >0.400 | 71 |
| LQ-18 | 1:1 XU59400.00: XU58320.01 | ole 1.0% black*** | >0.400 | >0.400 | | 80 |
| LQ-19 | Exact 4023 | eru 0.5% | | | | 80 |
| LQ-20 | Elvax 250/58320:01 1:1 | eru 0.5% | | | | |

*Advantage E29 is XU 58320.01 changed to Engage SM 1200
**TPO is Teknor-Apex 83F943DNT-729 blue oil TPO
***Black Colorant is PMS BN-68471NMBE
File: Case 16649 LQ Formulation.JWB

I claim:

1. A plastic closure for use with containers with hot contents or contents to be autoclaved comprising
    a base wall,
    a peripheral skirt,
    said base wall having an inner surface,
    a compression molded liner on said inner surface of said base wall of said closure,
    said liner comprising a fusion blend of a linear ethylene polymer made utilizing single-site catalysts and a lubricant,
    the amount of lubricant ranging between about 0.25% to 4.5% by weight of the liner,
    said fusion blend having a melt flow exceeding 20 gm/10 min to minimize pellet bounce when a pellet is delivered to the base wall,
    said liner having a density running between about 0.880 g/cc and about 0.915 g/cc.

2. The plastic closure set forth in claim 1 wherein said lubricant comprises an amide.

3. The plastic closure set forth in claim 2 wherein said lubricant is selected from the group consisting of oleamide, erucamide, stearamide, and EBS (ethylene bis stearamide).

4. The plastic closure set forth in claim 3 wherein said lubricant comprises oleamide and ranges between about 0.25% to 2.0% by weight of the liner.

5. The plastic closure set forth in claim 3 wherein the lubricant comprises erucamide and ranges between about 0.25% to 2.0% by weight of the liner.

6. The plastic closure set forth in claim 3 wherein said lubricant comprises a mixture of oleamide and erucamide and comprises a total amount of about 1.0% by weight of the liner.

7. The plastic closure set forth in claim 3 wherein said lubricant comprises a mixture of erucamide and EBS and comprises a total amount of 1% by weight of the liner.

8. The plastic closure set forth in claim 3 wherein said lubricant comprises an amide and the amount ranges between about 0.5% and about 2% by weight of the liner and the density of the liner ranges between 0.900 and 0.915 g/cc.

9. The plastic closure set forth in claim 3 wherein the lubricant comprises an oleamide and ranges between about 0.25% and 0.60% by weight of the liner and the density of the liner ranges between about 0.880 g/cc and 0.900 g/cc.

10. The plastic closure set forth in claim 3 wherein the lubricant comprises oleamide and ranges between about 0.5% and 1.0% by weight of the liner and the density of the liner is not less than 0.880 g/cc.

11. The plastic closure set forth in any one of claims 1–10 wherein said linear ethylene polymer is selected from the group consisting of ethylene-1-octene copolymers and ethylene-1-butene copolymers.

12. The method of making a plastic closure with a liner comprising
    providing a plastic closure having a base wall with an inner surface and a peripheral skirt,
    providing a fusion blend of a linear ethylene polymer made utilizing single-site catalysts and a lubricant in an amount ranging between about 0.25% to 4.5% by weight of the fusion blend, said fusion blend having a melt flow exceeding 20 gm/10 min,
    severing a pellet from said fusion blend,
    delivering said pellet to said inner surface of the base wall such that the melt flow of the fusion blend minimized pellet bounce, and
    compression molding said pellet to form a liner having a density range between about 0.880 g/cc and about 0.915 g/cc.

13. The method of making a plastic closure set forth in claim 12 wherein said lubricant comprises an amide.

14. The method of making a plastic closure set forth in claim 13 wherein said lubricant is selected from the group consisting of oleamide, erucamide, stearamide, and EBS (ethylene bis stearamide).

15. The method of making a plastic closure set forth in claim 14 wherein said lubricant comprises oleamide and ranges between about 0.25% to 2.0% by weight of the pellet.

16. The method of making a plastic closure set forth in claim 14 wherein the lubricant comprises erucamide and ranges between about 0.25% to 2% by weight of the pellet.

17. The method of making a plastic closure set forth in claim 4 wherein said lubricant comprises a mixture of oleamide and erucamide and comprises a total amount of about 1.0% by weight of the pellet.

18. The method of making a plastic closure set forth in claim 14 wherein said lubricant comprises a mixture of erucamide and EBS and comprises a total amount of 1% by weight of the pellet.

19. The method of making a plastic closure set forth in claim 14 wherein said lubricant comprises an amide and the amount ranges between about 0.5% and about 2% by weight of the pellet and the density of the liner ranges between 0.900 and 0.915 g/cc.

20. The method of making a plastic closure set forth in claim 14 wherein the lubricant comprises an oleamide and ranges between about 0.25% and 0.60% by weight of the pellet and the density of the liner ranges between about 0.880 g/cc and 0.900 g/cc.

21. The method of making a plastic closure set forth in claim 1 wherein the lubricant comprises oleamide and ranges between about 0.5% and 1.5% by weight of the pellet and the density of the liner is not less than 0.880 g/cc.

22. The method of making a plastic closure set forth in any one of claims 12–21 wherein said linear ethylene polymer is selected from the group consisting of ethylene-1-octene copolymers and ethylene-1-butene copolymers.

* * * * *